US010100518B2

(12) United States Patent
Smith

(10) Patent No.: US 10,100,518 B2
(45) Date of Patent: Oct. 16, 2018

(54) UNIVERSAL BRACING BRACKET FOR ROOF ERECTION

(71) Applicant: Dale Smith, Keewatin (CA)

(72) Inventor: Dale Smith, Keewatin (CA)

(73) Assignee: Dale Smith, Kenora, Ontario (CA)

(*) Notice: Subject to any disclaimer, the term of this patent is extended or adjusted under 35 U.S.C. 154(b) by 0 days.

(21) Appl. No.: 15/404,443

(22) Filed: Jan. 12, 2017

(65) Prior Publication Data
US 2017/0218625 A1  Aug. 3, 2017

Related U.S. Application Data

(60) Provisional application No. 62/278,112, filed on Jan. 13, 2016.

(51) Int. Cl.
E04B 7/04 (2006.01)
E04B 7/02 (2006.01)
F16M 13/02 (2006.01)

(52) U.S. Cl.
CPC ........... E04B 7/022 (2013.01); F16M 13/022 (2013.01)

(58) Field of Classification Search
CPC .............................. F16M 13/022; E04B 7/022
USPC ....................... 52/92.3, 93.1, 93.2
See application file for complete search history.

(56) References Cited

U.S. PATENT DOCUMENTS

| 4,449,335 A | 5/1984 | Fahey |
| 4,635,413 A * | 1/1987 | Hansen ............... E04B 1/24 403/402 |
| 5,094,059 A * | 3/1992 | Ganescu ............... E04B 1/3441 16/371 |
| 5,303,520 A * | 4/1994 | Gozdziak ............... E04B 7/04 403/59 |
| 5,832,838 A | 11/1998 | Shaw |
| D492,889 S | 7/2004 | Craine |
| 7,398,620 B1 | 7/2008 | Jones |
| 7,918,054 B2 | 4/2011 | Grafton et al. |
| 8,407,947 B2 | 4/2013 | Yaggi, Jr. et al. |
| 8,631,626 B2 | 1/2014 | Ballantine |
| 9,139,999 B2 | 9/2015 | Nicholls et al. |
| 9,175,472 B1 | 11/2015 | Calini |
| 2001/0025458 A1 | 10/2001 | James |
| 2002/0112439 A1 | 8/2002 | Rosas |
| 2003/0200705 A1 | 10/2003 | Collie |
| 2006/0254192 A1 | 11/2006 | Fennell, Jr. |

(Continued)

OTHER PUBLICATIONS

Building Component Safety Information, 2013 Edition, Updated Mar. 2015, retrieved from http://support.sbcindustry.com/docs/06_BCSI_booklet_FINAL.pdf BCSI-B1 (114 pages).

Primary Examiner — Basil S Katcheves
Assistant Examiner — Joshua K Ihezie
(74) Attorney, Agent, or Firm — Kagan Binder, PLLC

(57) ABSTRACT

Described herein is a truss/rafter roof erection device, kit and system. A removable universal bracing bracket assembly attaches to a construction member such as a truss on one end and includes at least one vertical bracket member attachable to a proximal end of a wood beam member that extends down to the ground to support the truss in an upright position during roof construction. Another pivoting bracket on the bracket assembly allows another wood beam member to be attached and extend down to the ground to further support the truss in an upright position.

14 Claims, 12 Drawing Sheets

(56) References Cited

U.S. PATENT DOCUMENTS

| | | |
|---|---|---|
| 2007/0292204 A1 | 12/2007 | Hackney |
| 2009/0193725 A1* | 8/2009 | Harrisson ............. E04B 1/3442 52/66 |
| 2009/0211177 A1* | 8/2009 | Grafton .................... E04B 7/02 52/93.1 |
| 2014/0318076 A1 | 10/2014 | Tan |
| 2014/0338282 A1 | 11/2014 | Sidhu |

* cited by examiner

UNIVERSAL BRACING BRACKET FOR ROOF ERECTION

PRIORITY CLAIM

The present nonprovisional patent application claims the benefit of and priority to, under 35 USC § 119(e), U.S. Provisional Patent Application No. 62/278,112, filed Jan. 13, 2016, entitled "UNIVERSAL BRACING BRACKET FOR ROOF ERECTION," the entirety of which is incorporated herein by reference.

FIELD OF THE INVENTION

The invention relates generally to a truss and rafter roof erection system and related accessories and components.

BACKGROUND

Currently there are a number of solutions for erecting a new truss/rafter roof with interconnecting pieces. Some of these solutions attempt to use traditional methods, which utilize temporary bracing consisting of extra pieces of lumber that are nailed together to hold up the truss or structure, but this solution fails to meet the needs of the market because the lumber used is most often discarded and wasted. Other solutions attempt to use a crane to lift trusses, but these solutions are similarly unable to meet the needs of the market because the time spent using the crane is often wasted. The use of a crane is also a poor solution for bracing trusses, as cranes are costly, so the more time the crane is in use the more expensive the project becomes. Using the bracing method to support and lift trusses also requires the time needed to properly secure, measure, and level trusses.

SUMMARY OF THE INVENTION

A temporary bracing system in the building construction industry is provided that is configurable for both residential as well as commercial purposes. It is designed to temporarily brace drop gables, common trusses, purlins, beams, posts or anything that needs to be braced and leveled securely. The bracing device disclosed herein also is applicable for horizontal or vertical bracing. It includes a pivoting member to be used in conjunction with conventional lumber to create adjustable directional bracing members. In any of the above embodiments, the bracing device can be used as a permanent brace as well and is not limited to temporary applications. Currently the method for bracing is by securing conventional lumber pieces together in such a way to stabilize what is being supported. There is no adjustability or flexibility in the currently used method and materials are wasted in the process. For example the BCSI (Building Component Safety Information) Guide to Good Practice for Handling, Installing, Restraining & Bracing of Metal Plate Constructed Wood Trusses; http://support.sbcindustry.com/docs/06_BCSI_booklet_FINAL.pdf BCSI-B1 illustrates the way a gable end in a roof erection is supported and braced to the ground. The Universal Bracing Bracket described herein allows for easier adjustment for different terrain and applications.

During the erection of trusses or drop gables of residential houses the builder normally has to support and brace the truss from the outside of the building using vertical and lateral bracing members to the ground. By using the Universal Bracing Bracket described herein all bracing can be achieved by bracing from the inside of the construction area making it safer, providing faster erection times and with the bracing structure taking up less area needed for bracing the truss. This is particularly advantageous when terrain is uneven and space is limited around the building. Different sizes of the Universal Brackets can be used with different thicknesses of walls and truss structures. The Universal Bracing Bracket described herein can be used to support columns, beams, purlins, and timbers; just about anything that needs to be braced and leveled securely in a confined area saving time and enhancing construction safety.

In one example embodiment, there is provided a roof erection assembly for stabilizing roof trusses during construction that includes a bracing bracket plate member having a lateral member protruding from a first side of the bracket plate, the lateral member protruding perpendicular to a longitudinal face on the first side of the bracing bracket, the bracing bracket plate member including at least one aperture to secure the bracing bracket plate member and the lateral member to a construction structure. The assembly further includes a bracing pivot member protruding from a second side of the bracket plate opposite the first side of the bracket plate, the bracing pivot member protruding perpendicular to an opposite longitudinal face on the second side of the bracing bracket opposite the lateral member. In addition, a vertical bracket member is also included that is movably coupled to the bracing pivot member and adapted to rotate about the bracing pivot member, the vertical bracket member including at least one aperture to secure part of a first construction brace member therein. Further, a lateral bracing assembly is included that is movably coupled to the vertical bracket member and including a rotational pivot bracket and a lateral brace pivot member movably coupled to the rotational pivot bracket, the rotational pivot bracket adapted to rotate about the vertical bracket member and the lateral brace pivot member adapted to move laterally within the rotational pivot bracket, wherein the lateral brace pivot member includes at a lateral brace bracket with at least one aperture to secure part of a second construction brace member therein.

In another example embodiment, a roof erection device for stabilizing roof trusses during construction is provided that includes a bracing bracket plate member including at least one aperture to secure the bracing bracket plate member to a construction structure and further includes a bracing pivot member protruding from a second side of the bracket plate opposite the first side of the bracket plate, the bracing pivot member protruding perpendicular to an opposite longitudinal face on the second side of the bracing bracket. The assembly also includes a vertical L-shaped bracket member movably coupled to the bracing pivot member and adapted to rotate about the bracing pivot member, the vertical bracket member including at least one aperture on a vertical bracket member wall to secure part of a first construction brace member thereon; and a lateral bracing assembly movably coupled to the vertical bracket member and including a u-shaped rotational pivot bracket and a lateral brace pivot member movably coupled to the rotational pivot bracket, the rotational pivot bracket adapted to rotate about the vertical bracket member and the lateral brace pivot member adapted to move laterally within the rotational pivot bracket, wherein the lateral brace pivot member includes at least a lateral brace bracket with at least one aperture on a lateral brace bracket wall to secure part of a second construction brace member thereon.

In another example embodiment, a roof erection kit for erecting and stabilizing a roof construction structure, such as a truss, rafter or gable, during construction includes at least two construction brace members and includes at least two universal bracing bracket devices. Each of the universal bracing bracket devices includes 1) a bracing bracket plate member having a lateral member protruding from a first side of the bracket plate, the lateral member protruding perpendicular to a longitudinal face on the first side of the bracing bracket, the bracing bracket plate member including at least one aperture to secure the bracing bracket plate member and the lateral member to a construction structure; 2) a bracing pivot member protruding from a second side of the bracket plate opposite the first side of the bracket plate, the bracing pivot member protruding perpendicular to an opposite longitudinal face on the second side of the bracing bracket opposite the lateral member; 3) a vertical bracket member movably coupled to the bracing pivot member and adapted to rotate about the bracing pivot member, the vertical bracket member including at least one aperture to secure part of the first construction brace member therein; and 4) a lateral bracing assembly movably coupled to the vertical bracket member and including a rotational pivot bracket and a lateral brace pivot member movably coupled to the rotational pivot bracket, the rotational pivot bracket adapted to rotate about the vertical bracket member and the lateral brace pivot member adapted to move laterally within the rotational pivot bracket, wherein the lateral brace pivot member includes at a lateral brace bracket with at least one aperture to secure part of the second construction brace member therein.

In yet another example embodiment, there is provided a method of erecting a roof structure using the roof erection device described above including the steps of inserting and securing a first wood beam member in the vertical bracket member and inserting and then securing a second wood beam member inserted in the lateral bracing member. The method further includes the step of placing a distal end of each of the first and second wood beam members on the ground.

It would be advantageous to have a system, as described herein, designed for anyone who builds residential homes to assist with erecting a new truss or rafter roof, making erecting of trusses and rafters a safer and faster method of roof construction. Among other things, it is an advantage of the invention to provide a truss or rafter roof erection system that does not suffer from any of the problems or deficiencies associated with prior solutions.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1A:
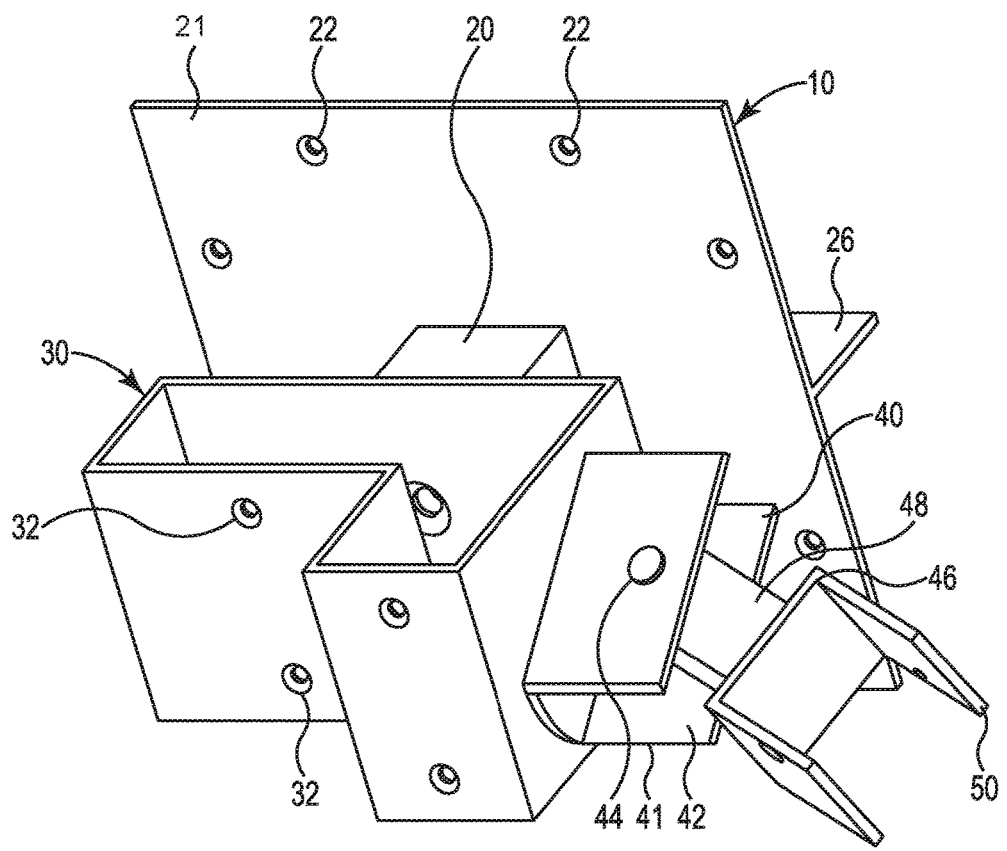
FIGS. 1A-1D illustrate a perspective view, a left side view, a right side view and a rear view of an example embodiment of a universal bracing bracket according to the teachings of the invention.
Figure 1B:
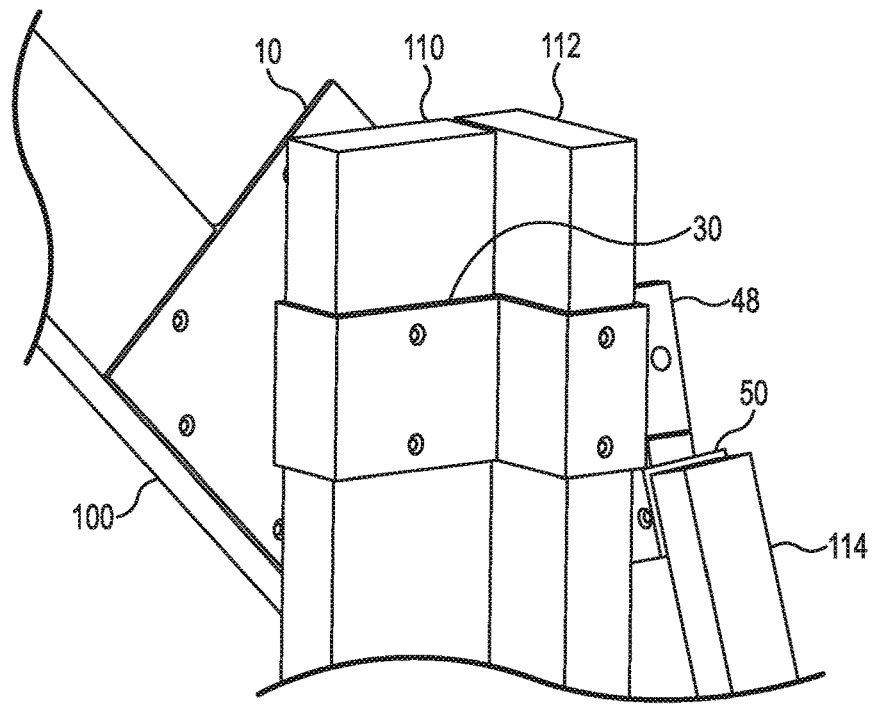
Figure 1C:
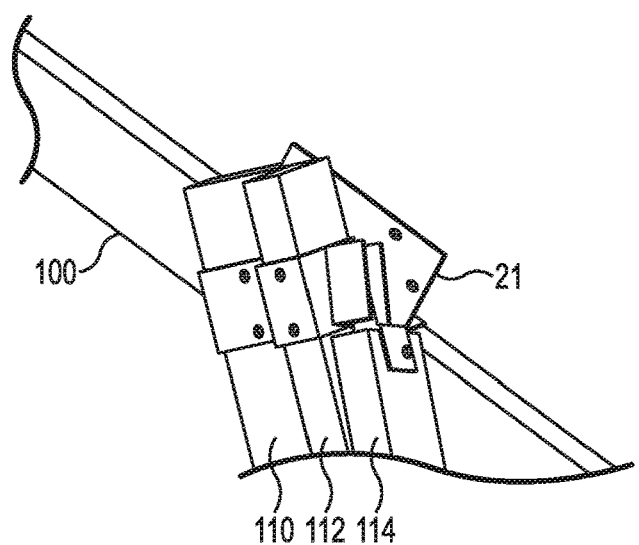
Figure 1D:
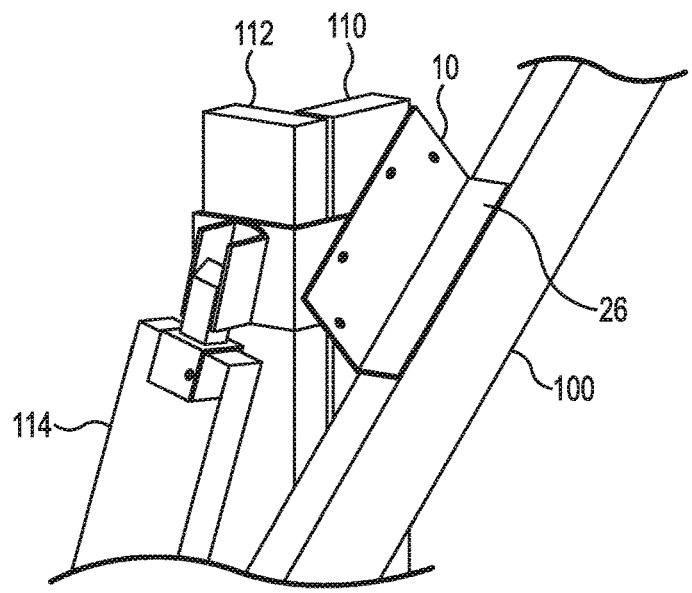

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The invention is directed to be a truss, rafter or gable roof erection device and system. The invention is a system designed to erect trusses and other roofing structures in a safer and faster manner with a reduction in waste of building materials. A universal bracing bracket attaches to a truss and then support wood members are attached to the bracing bracket that extend down to the ground to support the truss in an erect position. The universal bracing bracket can also attach to and brace a gable structure. The next truss can then be put in place. All consecutive trusses and rafter members are secured in the same manner. At the finish of the roof all of the universal bracing brackets can be removed and be used at the next jobsite.

Referring to the figures, FIGS. 1A-1D illustrate an example embodiment of a universal bracing bracket assembly 10 for erecting and stabilizing roof trusses during construction. Bracing bracket assembly 10 includes a bracing bracket plate member 21, including a plurality of holes 22 for adhering to a wood structure, having a lateral member 26 protruding from a first side of the bracket plate, the lateral member protruding perpendicular to a longitudinal face of the bracing bracket. The assembly 10 also includes a vertical bracing pivot member 20 protruding from a second side of bracket plate 21, bracing pivot member 20 protruding perpendicular to an opposite longitudinal face of bracing bracket 21 opposite lateral member 26. Pivot member 20 includes an attachment plate 24 having attachment holes. Assembly 10 also includes a vertical bracket member 30, which in this embodiment is L-shaped (but not limited to such a shape), which is coupled to bracing pivot member 20 and plate 24 and is adapted to rotate about the bracing pivot member 20 (potentially 360 degrees). The assembly 10 further includes a lateral bracing assembly 40 coupled to the vertical bracket member 30 and including a rotational pivot bracket 41 and a lateral brace pivot member 50 coupled to the rotational pivot bracket 41, the rotational pivot bracket 41 adapted to rotate about the vertical bracket member 30 (potentially 360 degrees) and the lateral brace pivot member 50 adapted to move laterally (potentially 180 degrees) within the rotational pivot bracket 41 via a pivot point 44 within a bracket 42. Lateral pivot member 50 also includes a U-shaped bracket with holes to attach to a wood beam that would extend to the ground to support the truss during construction. In a related embodiment, the U-shaped pivot bracket member is L-shaped.

Figure 1E:
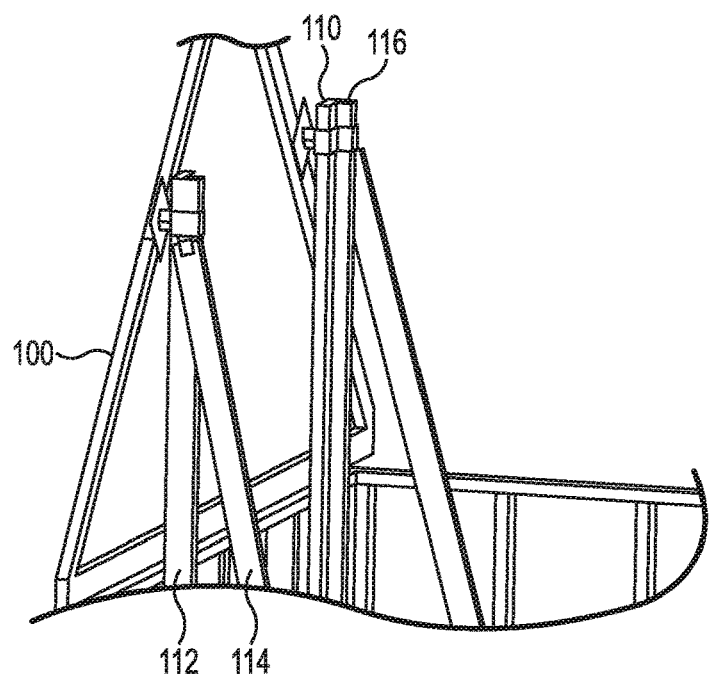
FIG. 1E illustrates an example embodiment of two universal bracing brackets supporting a truss structure according to the teachings of the invention.

The various brackets described herein can be box-like structures (such that the wood beams or construction members fit within the bracket) or are made of plates into L and U-shaped members which attach directly to the wood beams or wood spans. As seen in FIG. 1E, the L-shaped box-like bracket is adapted to receive the proximal end of two wood beams and then the U-shaped pivot bracket receives the proximal end of one wood beam while the distal ends are placed on the ground to support the construction structure. Finally, the erection assembly described herein can be used to erect any one of a truss, rafter and gable. In a related embodiment, a roof erection system using the roof erection device described above includes at least one wood beam member inserted in the vertical bracket member and a second wood beam member inserted in the lateral bracing member.

During the erection of trusses or drop gables of residential houses the builder normally has to support and brace the truss from the outside of the building using vertical and lateral wood board bracing members that span from the truss to the ground. By using the universal bracing bracket assembly 10 as described herein all bracing can be achieved by bracing from the inside of the construction area making it safer, as shown in FIG. 1E, thereby providing faster erection times and with the novel bracing structure taking up overall less area for bracing the truss. This is particularly advantageous when terrain is uneven and space is limited around the building. Different sizes of the Universal Brackets described herein can be used with different thicknesses of walls.

Figure 2:
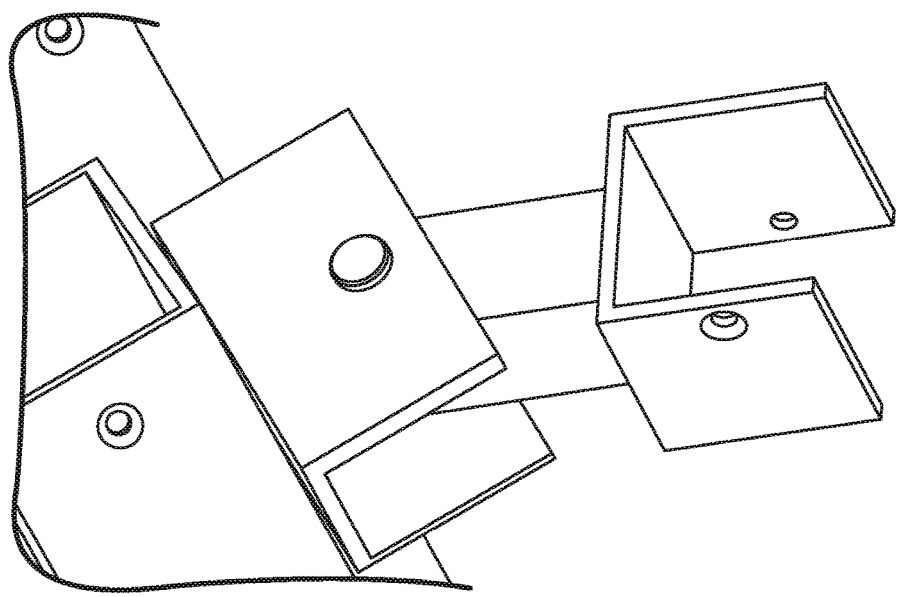
FIG. 2 illustrates perspective view of a lateral brace member of the universal bracing bracket of the invention.
Figure 3:
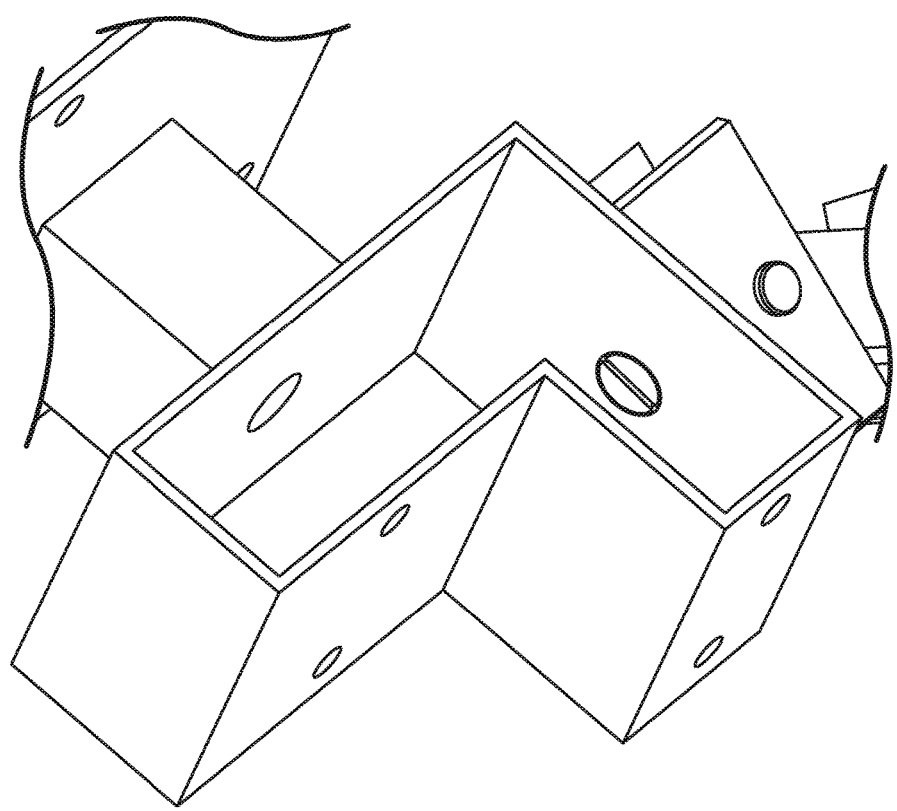
FIG. 3 illustrates a top view of a vertical bracket of the universal bracing bracket of the invention.
Figure 4:
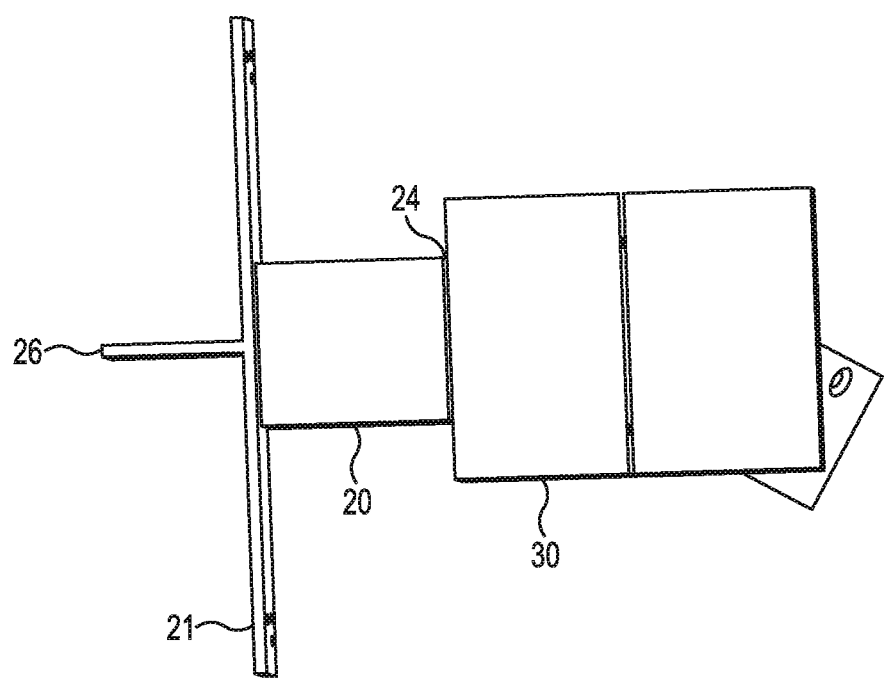
FIG. 4 illustrates a side view of the universal bracing bracket of the invention.

Referring now to FIGS. 2-4, these figures illustrate perspective and left and right side views of components of the universal bracing bracket of the invention. In particular, FIG. 2 illustrates perspective view of a lateral brace member of the universal bracing bracket of the invention and its ability to pivot within the rotational U-shaped bracket.

Figure 6:
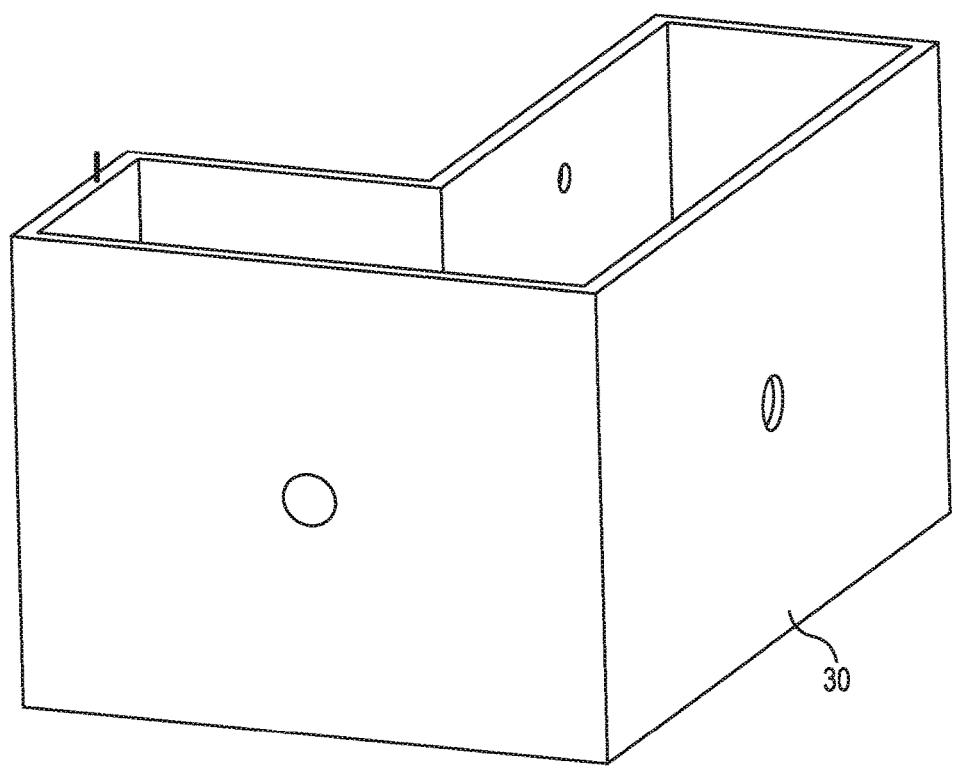
FIG. 6 is a perspective view of the vertical bracket of the universal bracing bracket of the invention.

FIG. 3 illustrates a top view of a vertical bracket of the universal bracing bracket of the invention and how construction members such as wood beams would fit inside the bracket and be secured within with nails or screws placed through the apertures in the wall of the bracket. FIG. 6 illustrates a perspective rear view of the vertical L-shaped bracket 30 of the universal bracing bracket of the invention.

FIG. 4 illustrates a side view of the universal bracing bracket of the invention with rotational pivot assembly 40, vertical L-shaped bracket 30 and the left side view of the entire bracing assembly 10 being illustrated.

Figure 5:
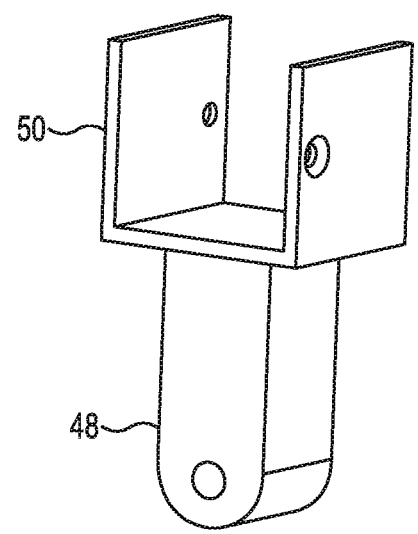
FIG. 5 illustrates a perspective view of the lateral brace pivot member of the bracing bracket of the invention.
Figure 7:
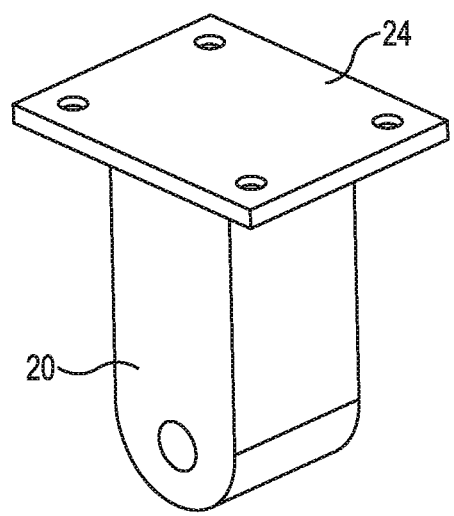
FIG. 7 is a perspective view of the lateral brace pivot of the universal bracing bracket of the invention.
Figure 8:
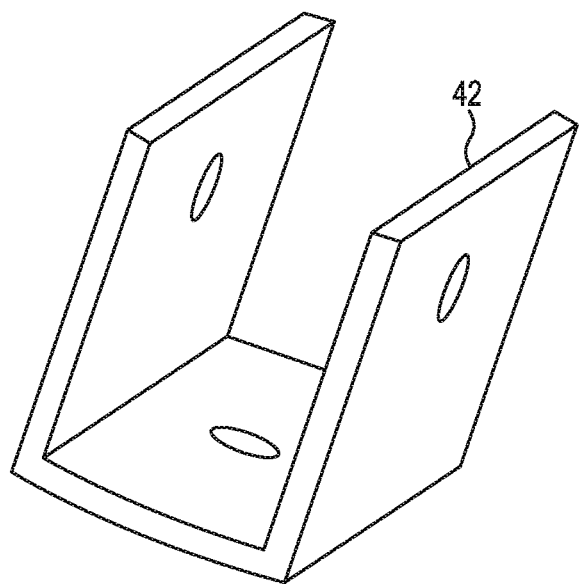
FIG. 8 is a perspective view of the rotational pivot bracket of the universal bracing bracket of the invention.

FIG. 5 illustrates a perspective view of the lateral brace pivot member 50 of the bracing bracket assembly that is able to cantilever with the rotational bracket. FIG. 7 is a perspective view of the lateral brace pivot of the universal bracing bracket of the invention that can either be used with a u-shaped bracket at the end to be attached to a wood beam or can be used as shown to be attached directly to a wood beam for erection stability. FIG. 8 is a perspective view of the rotational pivot bracket 50 that can be coupled to the lateral brace pivot 20 of the universal bracing bracket 10 of the invention.

Figure 9:
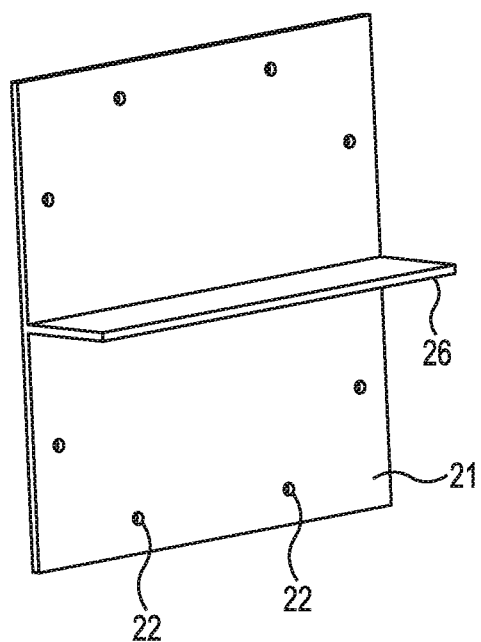
FIG. 9 illustrates a perspective rear view of the vertical bracing bracket plate of the universal bracing bracket of the invention.

FIG. 9 illustrates a perspective rear view of the vertical bracing bracket plate 21 of the universal bracing bracket 10 of the invention and how this part of the assembly would be attached to a portion of a truss or rafter. Note the perpendicular or lateral plate 26 protruding from plate 21 would rest on the rafter while plate 21 would be attached to the rafter with nails through holes or apertures 22.

Figure 10:
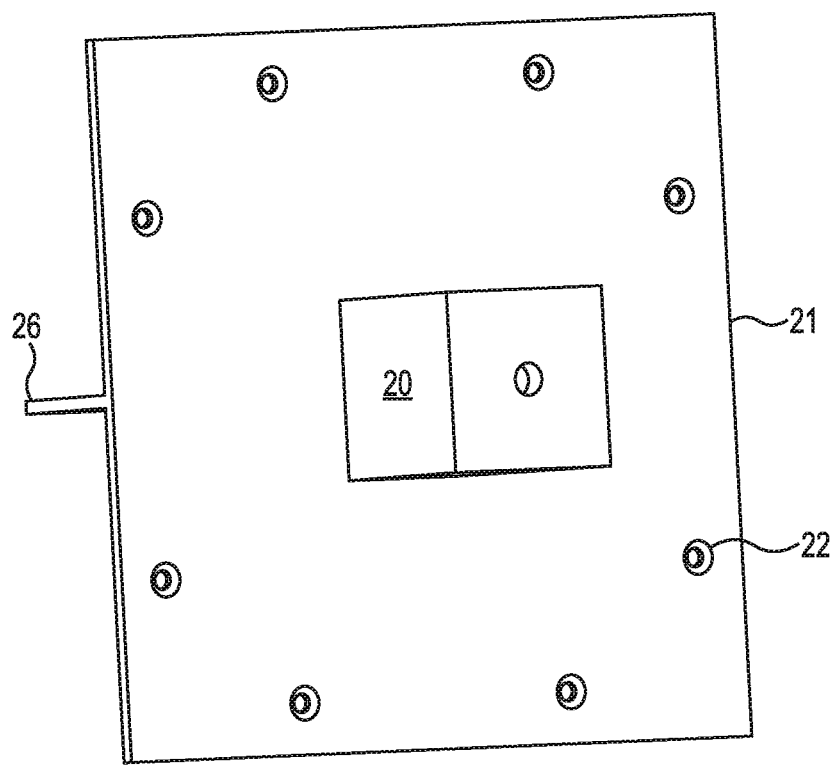
FIG. 10 illustrates a perspective front view of the vertical bracing bracket plate of the universal bracing bracket of the invention.

FIG. 10 illustrates a perspective front view of the vertical bracing bracket plate 21 of the universal bracing bracket 10 with vertical bracket pivot 20 before the vertical bracket 30 is attached.

Referring again to FIG. 1E and an example embodiment of a roof erection kit and the method of securing a truss 100, one side of the bracing bracket assembly 10, or lateral member 26, attaches to the bottom side of a drop gable attached with 4-1 Y" screws. Vertical pivoting bracket 30 attaches to a 2×4, 2×6, or 2×8 blocks or wood members to bring the drop gable up to a common truss height allowing for roof bracing to be attached. Two 2×4 wood beams 110 and 112 are nailed on the length to create an L shape to form a vertical brace. This L shape is then inserted to the vertical bracket (rotates 360 degrees) of the bracing bracket assembly 10 and is attached to the exterior gable wall to keep it secure and upright. A 2×4 wood beam member 114 is then inserted into the lateral brace pivot 50 which can be attached to the ground or to an adjacent wall depending on obstacles and space availability creating a lateral support to create a stable, secure support for truss 100. The pivot arm 50 can rotate 180 degrees in all directions. In a related embodiment, the bracing bracket 21 (or any of the other members of the bracing assembly) includes 1 or 2 leveling tubes with bubbles on the vertical bracket to allow for multi-directional leveling.

A method of erecting a roof structure using the roof erection device of claim 1 comprising the steps of inserting and securing a first wood beam member in the vertical bracket member and inserting and securing a second wood beam member inserted in the lateral bracing member; and placing a distal end of each of the first and second wood beam members on the ground.

The roof erection system described herein is attached, in one example embodiment, to a truss by a double headed nail (not shown). A double headed nail allows for easy removal once the trusses are erected and secured by the permanent roof sheeting. The structure of the universal bracing bracket and roof erection system provides superior strength and stability during construction and if a severe storm occurs during roof erection. The various embodiments described herein can be made of various types of metals as well as by plastic molding various parts with strong durable plastic.

The following patents and publications are herein incorporated by reference in their entireties: U.S. Pat. Nos. 5,303,520; 7,918,054 and 9,175,472.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

I claim:

1. A roof erection device for stabilizing a roof construction structure during construction comprising:
   a bracing bracket plate member having a lateral member protruding from a first side of the bracket plate, the lateral member protruding perpendicular to a longitudinal face on the first side of the bracing bracket, the bracing bracket plate member including at least one aperture to secure the bracing bracket plate member and the lateral member to a construction structure;
   a bracing pivot member protruding from a second side of the bracket plate opposite the first side of the bracket plate, the bracing pivot member protruding perpendicular to an opposite longitudinal face on the second side of the bracing bracket opposite the lateral member;
   a vertical bracket member movably coupled to the bracing pivot member and adapted to rotate about the bracing pivot member, the vertical bracket member including at least one aperture to secure part of a first construction brace member therein; and
   a lateral bracing assembly movably coupled to the vertical bracket member and including a rotational pivot bracket and a lateral brace pivot member movably coupled to the rotational pivot bracket, the rotational pivot bracket adapted to rotate about the vertical bracket member and the lateral brace pivot member adapted to move laterally within the rotational pivot bracket, wherein the lateral brace pivot member includes at least a lateral brace bracket with at least one aperture to secure part of a second construction brace member therein.

2. The roof erection device according to claim 1, wherein the vertical bracket is L-shaped and adapted to receive two wood beam members.

3. The roof erection device according to claim 1, wherein the vertical bracket is an L-shaped box-like structure adapted to receive one or two construction members.

4. The roof erection device according to claim 1, wherein the vertical bracket is a rectangular-shaped box-like structure adapted to receive one construction member.

5. The roof erection device according to claim 1, wherein the lateral brace pivot member includes a u-shaped bracket at an end.

6. The roof erection device according to claim 1, wherein the lateral brace pivot member includes an L-shaped bracket at an end.

7. The roof erection device according to claim 1, wherein the erection device is configured for erection of the construction structure selected from the group consisting of a truss, rafter and gable.

8. A roof erection system using the roof erection device of claim 1 comprising at least one wood beam member inserted in the vertical bracket member and a second wood beam member inserted in the lateral bracing member.

9. The roof erection device according to claim 1 wherein the vertical bracket member is configured to receive the first construction brace member and the lateral bracing member is configured to receive the second construction brace member.

10. A roof erection device for stabilizing a roof construction member during construction comprising:
    a bracing bracket plate member including at least one aperture to secure the bracing bracket plate member to a construction structure;
    a bracing pivot member protruding from a second side of the bracket plate opposite the first side of the bracket plate, the bracing pivot member protruding perpendicular to an opposite longitudinal face on the second side of the bracing bracket;
    a vertical L-shaped bracket member movably coupled to the bracing pivot member and adapted to rotate about the bracing pivot member, the vertical bracket member including at least one aperture on a vertical bracket member wall to secure part of a first construction brace member thereon; and
    a lateral bracing assembly movably coupled to the vertical bracket member and including a u-shaped rotational pivot bracket and a lateral brace pivot member movably coupled to the rotational pivot bracket, the rotational pivot bracket adapted to rotate about the vertical bracket member and the lateral brace pivot member adapted to move laterally within the rotational pivot bracket, wherein the lateral brace pivot member includes at least a lateral brace bracket with at least one aperture on a lateral brace bracket wall to secure part of a second construction brace member thereon.

11. A roof erection kit for erecting and stabilizing a roof truss during construction comprising:
    at least two construction brace members; and
    at least two universal bracing bracket devices each including:
    a bracing bracket plate member having a lateral member protruding from a first side of the bracket plate, the lateral member protruding perpendicular to a longitudinal face on the first side of the bracing bracket, the bracing bracket plate member including at least one aperture to secure the bracing bracket plate member and the lateral member to a construction structure;
    a bracing pivot member protruding from a second side of the bracket plate opposite the first side of the bracket plate, the bracing pivot member protruding perpendicular to an opposite longitudinal face on the second side of the bracing bracket opposite the lateral member;
    a vertical bracket member movably coupled to the bracing pivot member and adapted to rotate about the bracing pivot member, the vertical bracket member including at least one aperture to secure part of the first construction brace member therein;
    a lateral bracing assembly movably coupled to the vertical bracket member and including a rotational pivot bracket and a lateral brace pivot member movably coupled to the rotational pivot bracket, the rotational pivot bracket adapted to rotate about the vertical bracket member and the lateral brace pivot member adapted to move laterally within the rotational pivot bracket, wherein the lateral brace pivot member includes at least a lateral brace bracket with at least one aperture to secure part of the second construction brace member therein.

12. The kit according to claim 11 further including a third construction brace member adapted to be inserted in the vertical bracket member.

13. A method of erecting a roof structure using the roof erection device of claim 1 comprising the steps of inserting and securing a proximal end of a first wood beam member into the vertical bracket member and inserting and securing a proximal end of a second wood beam member into the lateral bracing member; and placing a distal end of each of the first and second wood beam members on the ground.

14. The method according to claim 13 further comprising the step of inserting and securing a proximal end of a third wood beam member into the vertical bracket member and then placing the distal end of the third wood beam member on the ground.

\* \* \* \* \*